United States Patent [19]
Kikuchi et al.

[11] Patent Number: 5,769,347
[45] Date of Patent: Jun. 23, 1998

[54] TAPE CARTRIDGE

[75] Inventors: Shuichi Kikuchi; Shintaro Higuchi, both of Miyagi; Toshiro Kobayashi, Kanagawa; Kazuo Sasaki, Miyagi, all of Japan

[73] Assignee: Sony Corporation, Tokyo, Japan

[21] Appl. No.: 682,552

[22] PCT Filed: Nov. 30, 1995

[86] PCT No.: PCT/JP95/02451

§ 371 Date: Sep. 18, 1996

§ 102(e) Date: Sep. 18, 1996

[87] PCT Pub. No.: WO96/17349

PCT Pub. Date: Jun. 6, 1996

[30] Foreign Application Priority Data

Nov. 30, 1994 [JP] Japan ..................... 6-321630

[51] Int. Cl.⁶ ............................... G11B 23/087
[52] U.S. Cl. ...................... 242/347; 242/352.4
[58] Field of Search .................. 242/342, 347, 242/352.4; 360/131

[56] References Cited

U.S. PATENT DOCUMENTS

| | | | |
|---|---|---|---|
| 4,564,878 | 1/1986 | Weavers et al. | 242/344 |
| 4,571,789 | 2/1986 | Morioka | 242/352.4 |
| 4,636,903 | 1/1987 | Rudi | 360/132 |
| 4,989,806 | 2/1991 | Eggebeen | 242/347 |
| 5,440,439 | 8/1995 | Rambosek et al. | 242/347 |
| 5,480,103 | 1/1996 | Gerfast et al. | 242/347 |
| 5,497,955 | 3/1996 | Angellotti et al. | 242/352.4 |
| 5,541,797 | 7/1996 | Ping et al. | 360/132 |
| 5,588,606 | 12/1996 | Kikuchi et al. | 242/342 |

FOREIGN PATENT DOCUMENTS 63-122967 8/1988 Japan .
7-114783 5/1995 Japan .

Primary Examiner—John P. Darling
Attorney, Agent, or Firm—Frommer Lawrence & Haug LLP; William S. Frommer

[57] ABSTRACT

A tape cartridge comprising a base plate, a pair of tape reels, a drive roller for allowing magnetic tape to undergo a traveling operation, and a cover member of synthetic resin attached to cover one surface side of the base plate. This tape cartridge comprises a pair of engagement recessed portions respectively provided on both sides of the cover member so that, at the time of loading into a tape drive unit, supporting members provided at the side of the unit are engaged therewith, an erroneous loading limiting portion being provided in either of the engagement recessed portions. A plurality of supporting mechanisms absorb expansion differences or contraction differences resulting from a difference between the coefficient of thermal expansion of the cover member and that of the base plate. The cover member is adapted so that when the portion in the vicinity of the side edge's engagement recessed portion is fixed by the fixing member, a supporting member provided at the drive unit side is engaged with the engagement recessed portion provided with the erroneous loading limiting portion, whereby even if such a force to separate the base plate and the cover member joined to each other is applied, separation between the base plate and the cover member is prevented.

7 Claims, 12 Drawing Sheets

TAPE CARTRIDGE

TECHNICAL FIELD

This invention relates to a tape cartridge used as a recording medium of a tape drive unit used as an auxiliary memory unit connected to data processing equipment such as computer, etc.

BACKGROUND ART

Hitherto, there have been used tape cartridges loaded into a tape drive unit used as an auxiliary recording unit for data processing equipment such as computer, etc. and adapted for recording data signals stored in the data memory section of the equipment body side, or recording data signals delivered to the data storage section of the equipment body side.

As a tape cartridge of this kind, there is known a tape cartridge in which a pair of reel support shafts are vertically provided on a base plate in a thin plate form which takes rectangular shape formed by metal such as aluminum, etc. to respectively rotatably support, through these reel support shafts, tape reels of the tape supply side and the tape winding side to wind a magnetic tape as an information recording medium extending over these tape reels, and a tape drive mechanism for allowing the magnetic tape to undergo traveling operation from the tape reel of the tape supply side to the tape reel of the tape winding side is further provided on the base plate.

This tape drive mechanism includes a drive roller rotatably supported on a drive roller support shaft vertically provided on the base plate, and belt guide rollers rotatably supported on a pair of guide support shafts similarly vertically provided on the base plate. Further, the tape drive mechanism includes an endless drive belt laid across the drive roller and a pair of belt guide rollers, and caused to be in force or pressure contact with the outer circumferential surface of the magnetic tape wound on a pair of tape reels. Further, the tape drive mechanism is adapted so that when the tape cartridge is loaded into the auxiliary recording unit, the capstan roller provided on the equipment side is caused to be in pressure-contact with the drive roller so that the drive roller is rotationally operated. When the drive roller is rotationally operated, the endless drive belt is caused to undergo traveling operation. Thus, a pair of tape reels with which the endless belt comes into pressure contact through the magnetic tape wound thereon is rotationally operated. When the tape reels are rotationally operated, the magnetic tape wound between these tape reels is caused to undergo traveling operation from one tape reel toward the other tape reel.

As stated above, the tape cartridge in which a pair of tape reels on which the magnetic tape is wound and a tape drive mechanism for allowing the magnetic tape to undergo traveling operation are provided on the base plate is adapted so that, with one surface of the base plate being as attachment reference surface, reel support shafts on which the tape reels are respectively supported, a drive roller support shaft on which the drive roller is supported, and guide support shafts on which belt guide rollers are supported are vertically provided. Namely, the reel support shafts, the drive roller support shaft and the guide support shafts are vertically provided on one surface of the base plate.

Moreover, at one surface side of the base plate, in order to prevent that the magnetic tape wound between tape reels and/or the tape drive mechanism are damaged resulting from the fact that foreign material comes into therewith or is attached thereto, a cover member is attached in a manner to cover a pair of tape reels on which the magnetic tape is wound and the tape drive mechanism. This cover member is formed by molding synthetic resin material, and is formed so as to take a square casing shape corresponding to the base plate. Further, the cover member is fixed on the base plate by fixing screws inserted through the other surface side of the base plate in the state where the end surface of the circumferential wall formed in a rising manner (hereinafter simply referred to as rising-formed depending upon circumstances) at the circumferential edge thereof is caused to be butted to or collide with one surface of the base plate. This fixing screw is screw-connected to the boss portion for attachment of screw projected on the cover member.

Meanwhile, in the tape cartridge of this kind, it is expected that recording capacity of data recorded on the magnetic tape is caused to be increased. In view of this, there has been proposed a tape cartridge adapted to accommodate a magnetic tape having large tape width in order to realize increase in the recording capacity without changing the outside dimension of the tape cartridge.

Namely, the conventional tape cartridge is adapted to accommodate a magnetic tape of which width is caused to be ¼ inches. However, in order to increase the recording capacity, a tape cartridge adapted so that a magnetic tape of which width is caused to be 8 mm is used has been proposed.

Since the tape cartridge in which the magnetic tape of width of ¼ inches is accommodated and the tape cartridge in which the magnetic tape of width of 8 mm is accommodated are common in the outside shape, there is the problem that it is difficult to easily discriminate, by visual observation, a tape cartridge within which a magnetic tape of which tape width is accommodated. For this reason, there is the possibility that the tape cartridge within which the magnetic tape of width of 8 mm may be erroneously loaded into a tape drive unit using a tape cartridge within which the magnetic tape of width of ¼ inches is accommodated. When the tape cartridge within which the magnetic tape of width of 8 mm is accommodated is loaded into the tape drive unit using the tape cartridge in which the magnetic tape of width of ¼ inches is accommodated, the magnetic tape is caused to undergo damage such that the both side edges of wide magnetic tape of width of 8 mm might be bent, resulting in the possibility that the magnetic tape is placed in the state where it cannot be used. The reason thereof is as follows. Namely, since the tape drive unit using the tape cartridge within which the magnetic tape of width of ¼ inches is accommodated is adapted so that the dimensions of the magnetic tape traveling drive system and/or height of the magnetic head are designed in correspondence with the magnetic tape of width of ¼ inches, when the magnetic tape of the width of 8 mm broader than ¼ inches is caused to undergo traveling operation while being slidably in contact with the magnetic head, the both side edges of the magnetic tape might be protruded from both ends of the magnetic head. As a result, the magnetic tape would suffer from fatal damage such that both side edges thereof are bent.

In view of the above, there has been proposed a tape cartridge provided with means for preventing erroneous loading in order that the tape cartridge within which the magnetic tape of width of 8 mm is accommodated is not erroneously loaded into the tape drive unit using the tape cartridge within which the magnetic tape of width of ¼ inches is accommodated.

The outline of the configuration of a tape cartridge 101 within which a magnetic tape of width of ¼ inches is accommodated will now be described. This tape cartridge 101 essentially comprises, as shown in FIG. 1, a base plate 102 on which a pair of tape reels on which magnetic tape 110 is wound and a tape drive mechanism for allowing the magnetic tape to undergo traveling operation are disposed, and a cover member 103 in square form formed by molding synthetic resin disposed so as to cover one surface side where drive mechanism, etc. is disposed of the base plate 102. At the cover member 103, as shown in FIGS. 1 and 2, there are provided engagement recessed portions 104, 105 with which supporting member for carrying out positioning of loading position provided at the drive unit side into which the disc cartridge 101 is loaded is engaged. These engagement recessed portions 104, 105 are formed at both side surface walls 106, 107 perpendicular to the front surface side of the cover member 103 into which the magnetic head and/or the capstan roller are admitted of the drive unit side. Further, respective engagement recessed portions 104, 105 are formed in parallel to the base plate 102 in the state where the front end surface side facing to the front side of the cover member 103 is opened, and the back surface side is closed.

At the tape drive unit 201 side where the tape cartridge 101 constituted as described above is loaded, a cartridge loading portion 202 is provided as shown in FIG. 3. The tape cartridge 101 is inserted into the tape cartridge loading portion 202 or is withdrawn (detached) therefrom, with the front side of the tape cartridge 101 being as insertion end, through an opening portion 203 of the front side. Further, at the inside surfaces of side surface walls 204 opposite to each other of the cartridge loading portion 202, there are provided in a projected manner (hereinafter simply referred to as projected depending upon circumstances) supporting members 205 engaged with engagement recessed portions 104, 105 provided on the both sides of the tape cartridge 101 to be loaded. This supporting member 205 is formed as length $L_2$ substantially equal to length $L_1$ of the engagement recessed portions 104, 105. Moreover, at the bottom surface wall 206 side of the cartridge loading portion 201, there is provided a positioning roller 207 engaged with a positioning recessed portion 108 which is cut and formed at one side of the base plate 102 of the tape cartridge 101 loaded in the cartridge loading portion 201. Further, at a back side wall 208 of the inward side of the cartridge loading portion 201, there is provided a cartridge loading detection mechanism 209 for detecting that the tape cartridge 101 has been loaded into the cartridge loading portion 201.

In order to allow the tape cartridge 101 within which the magnetic tape 110 of width of ¼ inches is accommodated to undergo loading with respect to the cartridge loading portion 202 of the tape drive unit 201 constituted as described above, the tape cartridge 101 is inserted through the opening portion 203 with the front surface side where the magnetic tape 110 is faced to the outward of the tape cartridge 101 being as insertion end. At this time, the tape cartridge 101 is inserted into the cartridge loading portion 202 is such a manner to engage the supporting members 205 with the engagement recessed portions 104, 105 formed at the both side surface walls 106, 107. Further, when the tape cartridge 101 is inserted up to the position at which insertion is detected by the cartridge loading detection mechanism 209 as shown in FIG. 4, loading with respect to the cartridge loading portion 202 is completed.

When the tape cartridge 101 is loaded into the cartridge loading portion 202 as shown in FIG. 4, the supporting members 205 are engaged with the engagement recessed portions 104, 105 over substantially total length. Thus, the positioning roller 207 is engaged with the positioning recessed portion 108. Further, the tape cartridge 101 is caused to undergo positioning in a height direction with the base member 102 being put between the supporting member 204 and the bottom surface wall 206 of the cartridge loading portion 202, and is caused to undergo positioning of loading position in a horizontal direction by positioning roller 207 engaged with the positioning recessed portion 108. Thus, the tape cartridge 101 is loaded into the cartridge loading portion 202.

On the other hand, the tape cartridge 120 within which magnetic tape 211 of width of 8 mm is accommodated, which can prevent erroneous loading into the tape drive unit 201 exclusively using, as the recording medium, the tape cartridge 101 within which the magnetic tape of width of ¼ inches is accommodated, is provided, within the engagement recessed portion 104 provided at one side surface wall of the cover member 103, with means for limiting loading into the cartridge loading portion 202 of the tape drive unit 201. Namely, within the engagement recessed portion 104, as shown in FIG. 5, there is provided a projecting portion 124 as means for limiting that the supporting member 205 provided at the cartridge loading portion 202 side is engaged therewith. This projecting portion 124 is formed so as to fill up a portion of the inward side of the engagement recessed portion 104 along an upper surface wall 111 of the cover member 103 as shown in FIG. 5, and is formed extending from the inward end of the engagement recessed portion 104 toward the intermediate portion thereof. In addition, an inclined surface portion 125 is formed at the front end surface side of the projecting portion 124.

As described above, when the tape cartridge 120 within which there is accommodated magnetic tape 211 of width of 8 mm provided with projecting portion 124 for filling up a portion of the engagement recessed portion 104 within the engagement recessed portion 104 is inserted into the cartridge loading portion 202 of the tape drive unit 201 in which tape cartridge 101 within which magnetic tape of width of ¼ inches is accommodated is exclusively used as the recording medium, the front end of the supporting member 205 engaged with the engagement recessed portion 104 comes into contact with the projecting portion 124 as shown in FIG. 6 so that further insertion into the cartridge loading portion 202 is limited. Thus, loading into the cartridge loading portion 202 is prevented. In more practical sense, it is limited that the cartridge loading detection mechanism 209 is operated by the tape cartridge 120 inserted into the cartridge loading portion 202. As a result, it is not detected that the tape cartridge 120 is loaded into the cartridge loading portion 202. Further, it is limited that the positioning roller 207 is engaged with the positioning recessed portion 108 provided at the base plate 102.

However, in the tape cartridge 120 adapted so that insertion into the cartridge loading portion 202 is prohibited by contact between the projecting portion 124 and the supporting member 205, when the projecting portion 124 and the supporting member 205 are caused to be in contact with each other, whereupon the tape cartridge 210 is further thrust or forced into the cartridge loading portion 202, the supporting member 205 is admitted into the engagement recessed portion 104 in a manner to ride on the projecting portion 124. When the tape cartridge 210 is forcedly inserted until the supporting member 205 rides on the projecting portion 124, such a force to separate the base plate 102 and the cover member 103 butt-joined to each other is exerted on the tape cartridge 210. Namely, there is exerted such a force to separate the cover member 103 from the base plate 102 caused to be put between the supporting member 205 and bottom surface wall 206 of the cartridge loading portion 202.

When the cover member 103 is separated from the base plate 102, foreign matter is admitted into the tape cartridge 120, or the like, so the magnetic tape 121 and/or the tape drive mechanism would be damaged.

In the tape cartridge 210 provided with means for preventing erroneous insertion as described above, it is necessary to firmly join or connect the base member 102 and the cover member 103 so that both members are not easily separated even when the tape cartridge 210 is erroneously loaded into the cartridge loading portion 202.

It is to be noted that the supporting member provided at the tape drive unit into which the tape cartridge 120 within which the magnetic tape 121 of 8 mm width is accommodated is loaded is formed so as to have length corresponding to the engagement recessed portion 104 formed short as the result of the fact that the projecting portion 124 provided on the tape cartridge 120 is provided.

Moreover, since the cover member provided at the tape cartridge as described above is attached on the base member with a view to providing protection of magnetic tape wound between tape reels and/or the tape drive mechanism, it is necessary that the cover member is attached on the base plate so that deformation such as bending, etc. is not applied onto the base plate even in the case where the tape cartridge undergoes impact such as falling, etc.

In view of the above, in the tape cartridge of this kind, the cover member is attached on the base plate in such a manner that a large number of portions are fixed by using a large number of fixing screws. As the result of the fact that a large number of portions are fixed in this way, even in the case where the tape cartridge is suffered from impact such as falling, etc., bending or deformation of the base plate is securely prevented, and an inconvenience such that gap takes place between the base plate and the cover member is prevented. Thus, secure protection of the magnetic tape and/or the tape drive mechanism covered by the cover member is attained. Further, as described above, in the tape cartridge provided with means for preventing erroneous insertion, even if it is erroneously loaded into the cartridge loading portion, a strong joint to such a degree that the base member and the cover member are not easily separated is guaranteed.

However, when the cover member is firmly fixed onto the base plate by using a large number of fixing screws, it becomes impossible to prevent distortion or deformation resulting from difference between coefficient of thermal expansion of the base plate formed by metal such as aluminum, etc., and that of the cover member formed by synthetic resin material. When such distortion or deformation takes place, so the base plate is bent or deformed, the degrees of perpendicularity of the reel supporting shaft, the drive roller supporting shaft and/or guide supporting shaft vertically provided with the base plate being as reference are impeded. As a result, stable rotation of the tape reel and/or drive roller, etc. fails to be realized. Thus, it would become impossible to travel the magnetic tape in a stable state at fixed position. Eventually, stable recording/reproduction of information signals with respect to the magnetic tape would be impossible.

DISCLOSURE OF THE INVENTION

An object of this invention is to provide a tape cartridge which can integrally securely attach the cover member with respect to the base plate without use of a large number of fixing screws, and which prevents easy separation between the base plate and the cover member even in the case where the tape cartridge is erroneously inserted into the cartridge loading portion, or even in the case where the tape cartridge suffers from impact such as falling, etc., thus making it possible to securely provide protection of the magnetic tape and/or the tape drive mechanism.

Another object of this invention is to provide a tape cartridge which can prevent easy separation between the base plate and the cover member and can securely prevent bending or deformation of the base plate.

A further object of this invention is to provide a tape cartridge which prevents distortion or deformation resulting from difference between coefficient of thermal expansion of material constituting the base plate and that of material constituting the cover member, thus making it possible to guarantee stable traveling of the magnetic tape at all times.

This invention proposed in order to realize objects as described above is directed to a tape cartridge essentially comprising a base plate of metal on which there are vertically provided a pair of reel support shafts on which a pair of tape reels across which a tape body is laid are rotatably supported in parallel, and a drive roller support shaft on which a drive roller for allowing the tape body laid across the tape reels to undergo traveling operation from one tape reel toward the other tape reel is rotatably pivotally supported, and a cover member of synthetic resin attached in the state butted to one surface side in a manner to cover one surface side of the base plate on which the pair of tape reels and the drive roller are disposed. This tape cartridge comprises a pair of engagement recessed portions respectively provided on the both sides of the cover member, and adapted so that a supporting member provided at the side of a tape drive unit is engaged therewith at the time of loading into the tape drive unit, an erroneous loading limiting portion being provided at either one of the pair of engagement recessed portions, a plurality of supporting mechanisms for absorbing expansion difference or contraction difference in the plane surface direction of the base plate produced resulting from difference between coefficient of thermal expansion of the cover member and that of the base plate when the cover member and the base plate are joined or connected to each other to support the cover member and the base plate, and at least one fixing member for fixing, onto the base plate, a cover member attached in the state butted to one surface side of the base plate.

The cover member of the tape cartridge is adapted so that the portion in the vicinity of the side edge where the engagement recessed portion provided with the loading limiting portion is provided is fixed by fixing member, whereby the supporting member provided at the tape drive unit side is engaged with the engagement recessed portion provided with the loading limiting portion. Thus, even if such a force to separate the base plate and the cover member joined to each other is applied, easy separation between the base plate and the cover member is prevented.

Moreover, the cover member may be attached on the base plate in the state where at least one portion of the portion in the vicinity of the central portion in left and right directions extending over arrangement direction of a pair of tape reels which does not exert bad influence on the drive roller on which the magnetic tape is traveled even if the base plate is deformed is fixed by the fixing member.

Further, the cover member is adapted so that even if there is fixed by fixing member one portion of the back side position of a reflection mirror disposed in the state positioned on the front side where the magnetic tape is faced to the outward close to the engagement recessed portion provided with the erroneous loading limiting portion, the supporting member provided at the tape drive unit side is engaged with the engagement recessed portion provided with the erroneous loading limiting portion, whereby even if such a force to separate the base plate and the cover member joined to each other is applied, easy separation between the base plate and the cover member is prevented.

In this case, fixing screws screw-connected to a boss portion projected at the surface side opposite to the base plate of the cover member are used as the fixing member.

Moreover, the fixing member for fixing the cover member onto the base plate may be fixing means which can fix the position where the cover member is attached to the base plate, and may be constituted by a supporting pin projected on the surface side opposite to the base plate of the cover member and force-inserted into a penetration hole bored at the base plate.

Further, the supporting mechanism for supporting the cover member on the base plate is composed of a plurality of supporting pins projected on the surface side opposite to the base plate of the cover member, and each provided with an insertion portion of diameter smaller than that of penetration hole, inserted through a penetration hole provided at the base plate, and a slipping off prevention member provided at the front end side of the supporting pin of which insertion portion is inserted through the penetration hole.

Furthermore, the slipping-off preventing member for carrying out prevention of slipping off from the base plate of the supporting pin is constituted by a swollen portion formed by thermally deforming the front end portion of the supporting pin projected from the penetration hole toward the other surface side of the base plate.

In addition, as the slipping off preventing member, there may be used head portion of engagement member attached to the front end portion of the supporting pin inserted through the penetration hole.

BEST MODE FOR CARRYING OUT THE INVENTION

A more practical embodiment of a tape cartridge according to this invention will be described below.

Figure 7:
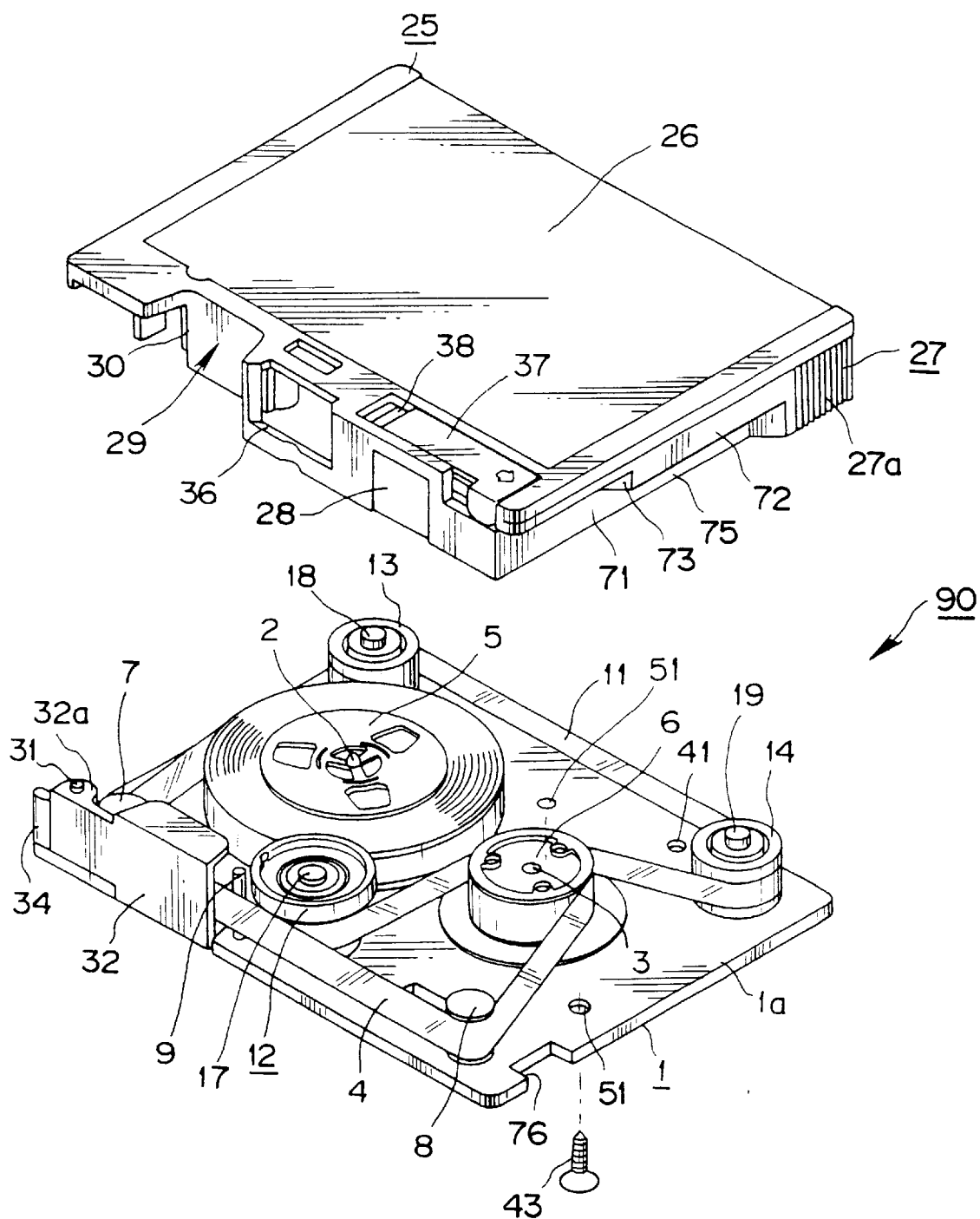
FIG. 7 is an exploded perspective view showing the tape cartridge according to this invention in the state where the cover member is detached therefrom.
Figure 8:
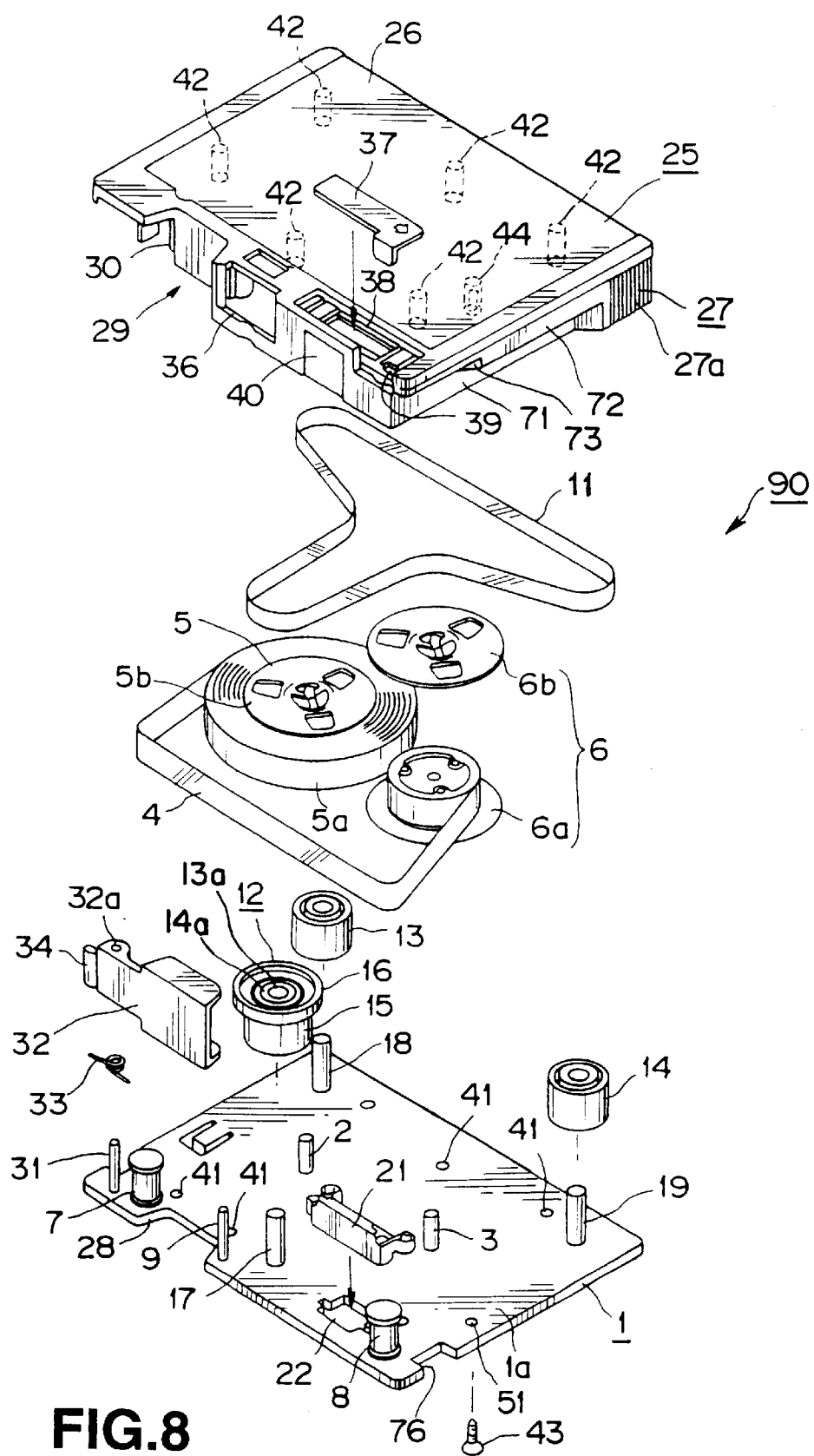
FIG. 8 is an exploded perspective view showing tape reel and tape drive mechanism disposed on base plate.
Figure 9:
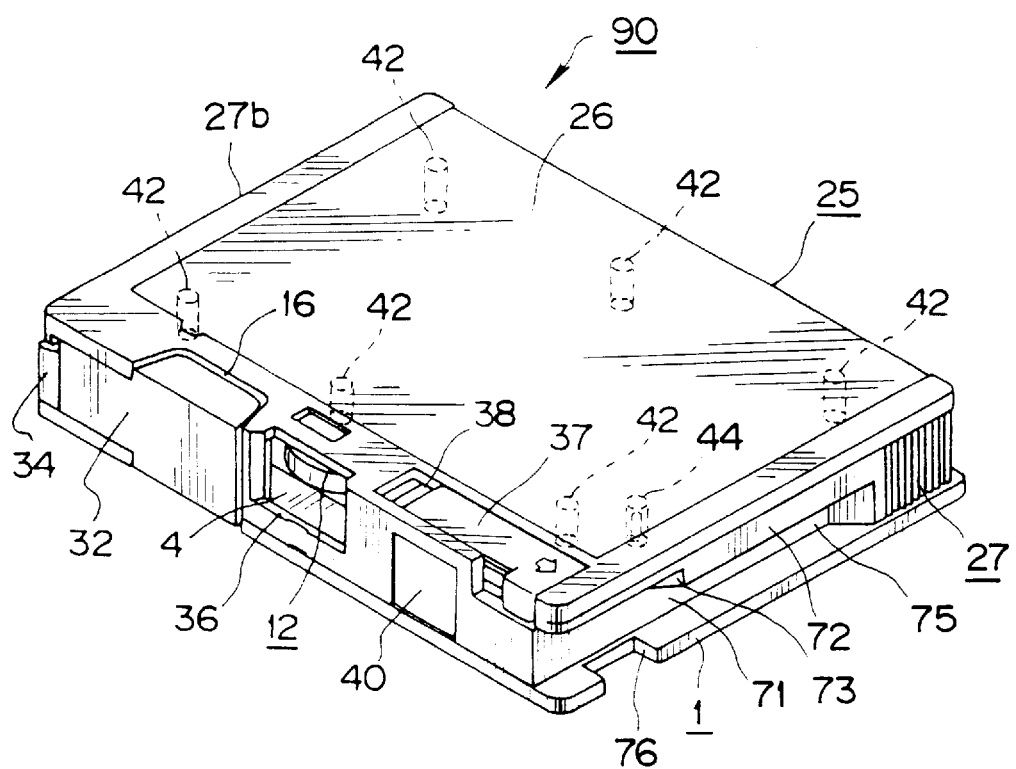
FIG. 9 is a perspective view of the tape cartridge according to this invention.

Tape cartridge 90 of this embodiment includes a base plate 1 in thin plate form which takes rectangular shape consisting of metal such as aluminum or aluminum alloy, etc. as shown in FIGS. 7, 8 and 9. Substantially at the central portion of one surface 1a side of the base plate 1, a pair of reel support shafts 2, 3 are vertically provided in a manner spaced in a length direction. On these reel support shafts 2, 3, tape reels 5, 6 on which a magnetic tape 4 which is a tape body serving as an information recording medium is wound are rotatably supported. Namely, a pair of tape reels 5, 6 are arranged in parallel in left and right directions with the center line in the length direction of the base plate 1 being as center. These tape reels 5, 6 are respectively composed of lower reel members 5a, 6a each provided with reel hub is integrally formed, and upper reel members 5b, 6b connected to the lower reel members 5a, 6a, and initial end and terminating end of the magnetic tape 4 are respectively fixed on the reel hubs by clumper (not shown).

As the magnetic tape 4 used in this embodiment, a magnetic tape in which tape width is caused to be 8 mm is used.

Namely, the tape cartridge 90 of this embodiment is adapted to accommodate therewithin magnetic tape 4 of which width is caused to be 8 mm, and the dimensions of the appearance are caused to be common to the previously described tape cartridge 101 within which magnetic tape 110 of width of ¼ inches is accommodated.

The magnetic tape 4 drawn out from one tape reel 5 serving as the tape supply side is laid across tape guide rollers 7, 8 rotatably supported on support shafts respectively vertically provided at both corner portions of the front side of the base plate 1 and each provided with a flange portion for prevention of slipping off circumferentially projected at the upper edge portion, and a guide pin 9 vertically provided at the front edge side of the base plate 1 in the state positioned between these tape guide rollers 7, 8, whereby the magnetic tape 4 is traveled along the front edge portion of the base plate 1 as shown in FIG. 7 so that it is wound onto the other tape reel 6 serving as the tape winding side.

Moreover, at one surface 1a side of the base plate 1, a tape drive mechanism for traveling the magnetic tape 4 drawn out from one tape reel 5 toward the other tape reel 6 side is disposed. This tape drive mechanism is composed of an endless belt 11, and a drive roller 12 and a pair of belt guide rollers 13, 14 across which the endless belt 11 is laid.

Further, the drive roller 12 constituting the tape drive mechanism is formed by elastic material having abrasion resistance property, and includes a bearing portion 14a having a shaft hole 13a bored at the central portion thereof, wherein a cylindrical roller body portion 15 is integrally formed on the outer circumferential side of the bearing portion 14a so that double tubular structure is formed. At the upper end side of the roller body portion 15, a drive flange portion 16 is projected in a ring form. The roller body portion 15 of the drive roller 12 is caused to serve as the portion on which the endless belt 11 is wound, and is formed so as to have a height substantially equal to width of the magnetic tape 4 traveled while being in slidably in contact with the outer circumferential surface of the endless belt 11. In addition, the drive flange portion 16 is caused to be driven portion with which capstan roller disposed at the tape drive unit into which the tape cartridge 90 is loaded is in pressure contact to undergo rotational drive force of the capstan roller so that it is rotationally driven.

The drive roller 12 formed as described above is rotatably attached through a drive roller support shaft 17 vertically provided substantially at the central portion of the front side of the base plate 1. A pair of belt guide rollers 13, 14 are formed cylindrical by elastic (resilient) material having abrasion resistance property, and are rotatably attached through a pair of guide support shafts 18, 19 respectively vertically provided at both corner portions of the backward side opposite to the side where the drive roller 12 is disposed of the base plate 1. The endless belt 11 is folded (turned back) in the state where it is in pressure-contact with the outer circumferential surface of the magnetic tape 4 wound on one tape reel 5 and the other tape reel 6 from belt guide rollers 13, 14, and is laid across the drive roller 12 via the central space portion between these tape reels 5, 6. Thus, the endless belt 11 is traveled along traveling path in substantially convex shape on the base plate 1.

Further, at the position close to one tape guide roller 8 side at the front side of the base plate 1, there is attached a reflection mirror 21 constituting a specification detection mechanism for detecting specification information such as kind or recording density, etc. of the tape provided in the magnetic tape 4 wound on the tape reels 5, 6. This reflection mirror 21 is attached in such a manner that it is fitted into an attachment hole 22 bored in the base plate 1 through attachment member.

When the tape cartridge 90 is loaded into the tape drive unit, light emitted from a light emitting element disposed at the tape drive unit side is incident from the other surface 1b side of the base plate 1 to the reflection mirror 21 constituting the specification detection mechanism. The light incident to the reflection mirror 21 is reflected by the reflection mirror 21. A reflected light thus obtained is incident to the magnetic tape 4 opposite to the reflection mirror 21. The light incident to the magnetic tape 4 is received by light receiving element disposed at the tape drive side in such a manner opposite to the reflection mirror 21. By detecting the state received by the light receiving element, specification of the magnetic tape 4 is discriminated.

Meanwhile, the reel support shafts 2, 3 on which a pair of tape reels 5, 6 are supported, the drive roller support shaft 17 on which the drive roller 12 is supported, and a pair of guide support shafts 18, 19 on which a pair of belt guide rollers 13, 14 are supported are adapted so that one surface 1a of the base plate 1 is caused to be attachment reference surface and those support shafts are vertically provided perpendicular to the attachment reference surface, whereby degree of parallelization (parallelism) therebetween is maintained. Further, the rotational direction of the tape reels 5, 6, the drive roller 12 and the belt guide rollers 13, 14 supported through these respective support shafts 2, 3, 17, 18 and 19 is caused to be precisely in parallel to one surface 1a of the base plate 1. When the tape reels 5, 6, the drive roller 12 and the belt guide rollers 13, 14 are rotated in a manner to maintain the state precisely in parallel to one surface 1a of the base plate 1, the endless belt 11 is also caused to undergo traveling operation in parallel to one surface 1a of the base plate 1. Thus, the magnetic tape 4 caused to undergo traveling operation by traveling of the endless belt 11 is also caused to undergo traveling operation in parallel to one surface 1a of the base plate 1.

In view of the above, the base plate 1 is formed with the degree of flatness of high accuracy, and is formed so that respective support shafts 2, 3, 17, 18 and 19 can be vertically provided with the degree of perpendicularity of high accuracy on one surface 1a serving as the attachment reference surface.

Moreover, the other surface 1b of the base plate 1 is used as the loading reference surface when the tape cartridge 90 is loaded into the tape drive unit.

At one surface 1a side of the base plate 1, a cover member 25 is attached in a manner to cover a pair of tape reels 5, 6 and the tape drive mechanism. As shown in FIGS. 7 and 8, this cover member 25 is formed by molding transparent or semi-transparent synthetic resin material, e.g., polycarbonate resin, and is formed so as to take a square casing shape corresponding to the appearance of the base plate 1. Namely, the cover member 25 is formed so as to take a square casing shape by forming in a rising manner (hereinafter simply referred to as rising-formed depending upon circumstances) a circumferential side wall 27 at the circumferential edge of a plane surface portion 26 which covers a pair of tape reels 5, 6 and the tape drive mechanism in a manner opposite to one surface 1a of the base 1.

At one corner portion of the front surface portion of the cover member 25, as shown in FIGS. 7 and 8, there is formed a recessed portion 30 for admission of head, which constitutes, together with a cut portion 28 formed at the front side edge portion of the base plate 1, an opening portion 29 for recording/reproduction into which a magnetic head for recording/reproduction disposed at the tape drive unit side into which the tape cartridge 90 is loaded is admitted and in which a portion of the magnetic tape 4 is faced to the outward.

It is to be noted that the recording/reproduction opening portion 29 constituted by the cut portion 28 formed at the base plate 1 and the head admission recessed portion 30 formed at the cover member 25 is closed by an opening/closing member 32 rotatably supported through a support shaft 31 vertically provided at one corner portion of the front side of the base plate 1 in the state where the tape cartridge 90 is not used. This opening/closing member 32 is rotatably supported with the support shaft 31 being as center in the state where a bearing portion 32a formed at one side portion is pivotally supported by the support shaft 31. Moreover, the opening/closing member 32 is rotatably biased in a direction to close the recording/reproduction opening portion 29 by a torsional coil spring 33 assembled into the support shaft 31. Further, at the side edge of the supporting portion side to the support shaft 31 of the opening/closing member 32, a rotational operation portion 34 projected toward the side surface of the cover member 25 is integrally formed. The opening/closing member 32 is adapted so that when the tape cartridge 90 is loaded into the tape drive unit, the opening/closing member 32 is rotationally operated against biasing force of the torsional coil spring 33 as the result of the fact that the rotational operation portion 34 is caused to undergo pressing operation by the rotational operation mechanism provided at the tape drive unit side to open the recording/reproduction opening portion 29.

Moreover, at the front surface side of the cover member 25, there is opened an opening portion 36 for drive which takes rectangular shape to allow a portion of the circumferential surface of the drive roller 12 attached on the base plate 1 to be faced to the outward when the cover member 25 is attached on the base plate 1. When this tape cartridge 90 is loaded into the tape drive unit, the capstan roller provided at the tape drive unit side is admitted into the drive opening portion 36, and is caused to be in pressure-contact with the drive roller 12.

Further, at the portion extending from the plane surface portion 26 of the cover member 25 toward the front surface side of the circumferential side wall 27, there is provided an erroneous recording prevention member 37 for preventing that data signal recorded on the magnetic tape 4 wound between a pair of tape reels 5, 6 disposed on the base plate 1 is erroneously erased. This erroneous recording prevention member 37 is attached within a slide groove 38 provided in the state positioned at the side opposite to the side where the head admission recessed portion 30 is provided. Further, the erroneous recording prevention member 37 is caused to undergo slide operation ranging between the position where an erroneous recording detection hole 39 bored within the slide groove 38 is closed and the position where that erroneous recording detection hole 39 is opened. This disc cartridge is adapted so that when the erroneous recording prevention member 37 is placed in the state where it is caused to undergo movement operation to the position where the erroneous recording detection hole 39 is opened, it inhibits recording of data signals onto the magnetic tape 4.

Furthermore, at the front surface side of the cover member 25, there is provided a light transmission portion 40 for allowing light transmitted through the reflection mirror 21 disposed on the base plate 1 to be transmitted toward the outward of the tape cartridge 90. This light transmission portion 40 is adapted so that when the cover member 25 is attached on the base plate 1, it is provided at the position opposite to the reflection mirror 21 disposed on the base plate 1.

Figure 1:
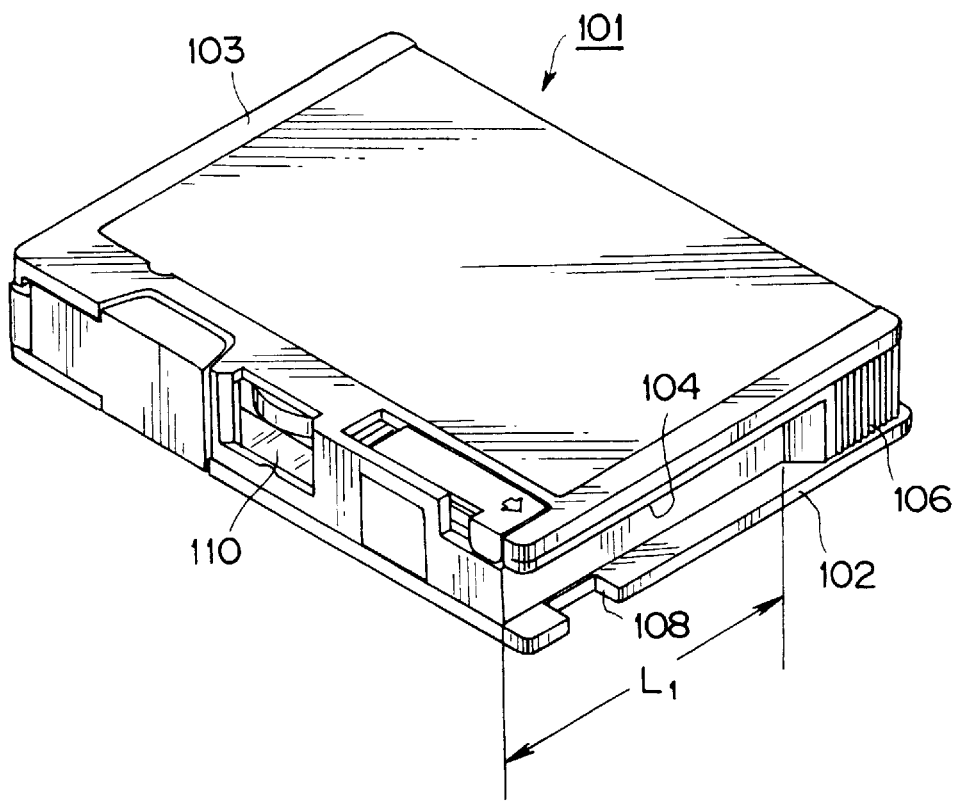
FIG. 1 is a perspective view when tape cartridge within which magnetic tape of ¼ inch width is accommodated is viewed from one side.
Figure 2:
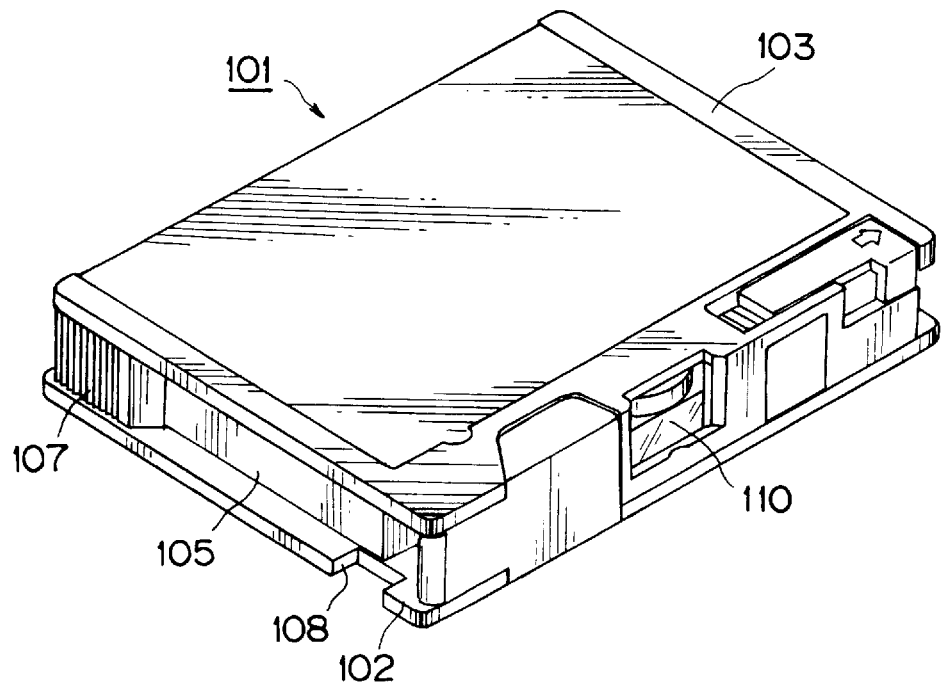
FIG. 2 is a perspective view when the tape cartridge shown in FIG. 1 is viewed from the other side.
Figure 3:
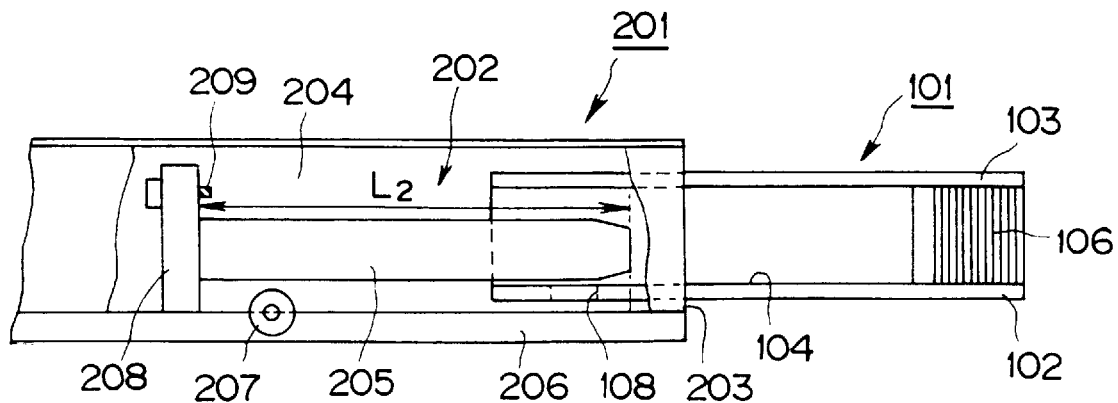
FIG. 3 is a side view showing the state where tape cartridge is loaded into cartridge loading portion of tape drive unit into which tape cartridge within which magnetic tape of ¼ inch width is accommodated is loaded.
Figure 4:
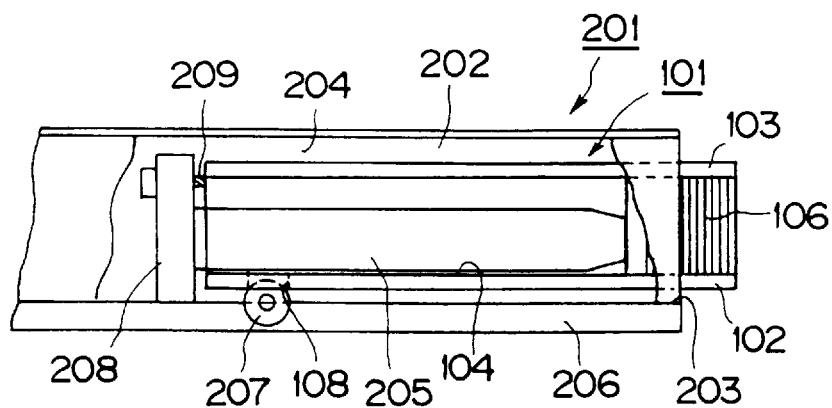
FIG. 4 is a side view showing the state where tape cartridge has been loaded into cartridge loading portion of the tape drive unit into which tape cartridge within which magnetic tape of ¼ inch width is accommodated is loaded.
Figure 5:
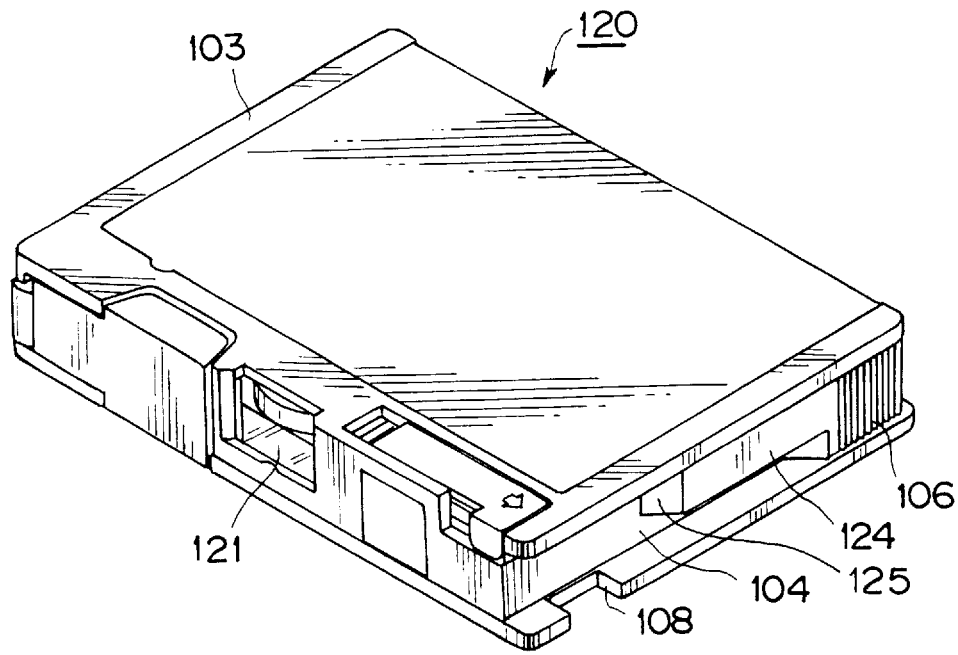
FIG. 5 is a perspective view when tape cartridge within which magnetic tape of 8 mm width is accommodated is viewed from one side.
Figure 6:
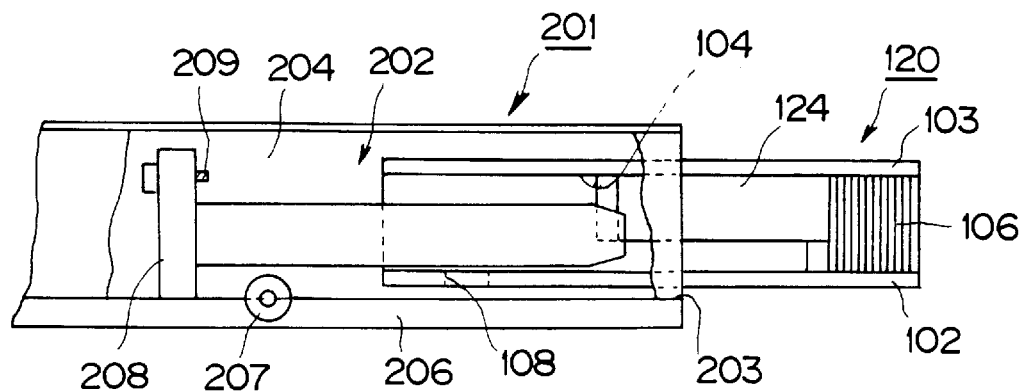
FIG. 6 is a side view showing the state where tape cartridge within which magnetic tape of 8 mm width is accommodated has been inserted into cartridge loading portion of tape drive unit into which tape cartridge within which magnetic tape of ¼ inch width is accommodated is loaded.

Meanwhile, at both side surface walls 27a, 27b perpendicular to the front surface side constituting the circumferential side wall 27 of the cover member 25, similarly to the previously described disc cartridge 121 shown in FIG. 5, engagement recessed portions 71 with which guide member for carrying out positioning of loading position provided at the tape drive unit side is engaged are respectively provided. These engagement recessed portions 71 are adapted so that when the cover member 25 is but-joined to the base plate 1, it is constituted as a recessed portion which is channel-shaped in cross section along with a portion of the base plate 1. In addition, the respective engagement recessed portions 71 are formed in parallel to the base plate 1 in the state where the front side of the cover member 25 is opened and the back side thereof is closed as shown in FIG. 9.

In this example, at side edges respectively corresponding to the engagement recessed portions 71, 71 of the base plate 1, as shown in FIG. 9, there are formed, by cutting, recessed portions 76, 76 for positioning with which a roller for positioning provided at the tape drive unit side is engaged when the tape cartridge 90 is loaded into the tape drive unit.

Meanwhile, within one engagement recessed portion 71 formed at one side surface wall 27a side opposite to the side where the recording/reproduction opening portion 29 is formed, there is provided a projecting portion 72 constituting means which prevents engagement of the supporting member 205 provided at the cartridge loading portion 202 of the tape drive unit 201 into which the previously described tape cartridge 101 within which the magnetic tape of ¼ inch width is accommodated is loaded to prevent erroneous loading. This projecting portion 72 is formed in a manner to fill up a portion of the inward side of t he engagement recessed portion 71 along the plane surface portion 26 of the cover member 25 as shown in FIGS. 7, 8 and 9, and is formed extending over the middle portion from the inward end of the engagement recessed portion 71. Moreover, the front end surface side of the projecting portion 72 is adapted so that when the tape cartridge 90 according to this invention is erroneously loaded into the tape drive unit 201 into which the previously described tape cartridge 101 within which the magnetic tape of ¼ inch width is accommodated is loaded, that front end surface side is formed as an inclined surface portion 73 in order that the supporting member 205 and the projecting portion 72 are not caused to be in contact with each other with great impact.

In this example, at the lower side portion along the base plate 1 side of the portion where the projecting portion 72 of one engagement recessed portion 71 is formed, an auxiliary engagement recessed portion 75 continuous to the engagement recessed portion 71 is formed. This auxiliary engagement recessed portion 75 is used in the case where the tape cartridge is loaded into the tape drive unit which permits loading of both the previously described tape cartridge 101 within which the magnetic tape of ¼ inch width is accommodated and the tape cartridge 90 according to this invention. Namely, in this tape drive unit, in order to permit loading of both the previously described tape cartridge 101 within which the magnetic tape of ¼ inch width is accommodated and the tape cartridge 90 according to this invention, a narrow supporting member which permits engagement extending from the engagement recessed portion 71 to the auxiliary engagement recessed portion 75 is provided.

Further, at the surface side opposite to the base plate 1 of the cover member 25, a plurality of supporting pins 42 supported through penetration holes 41 bored at the base plate 1 are integrally projected. These supporting pins 42 are projected toward the base plate 1 side in the state positioned within the area encompassed by the circumferential side wall 27 of the plane surface portion 26. Moreover, the respective supporting pins 42 are adapted so that when the cover member 25 is attached on the base plate 1, they are provided at positions where traveling of the magnetic tape 4 and/or the endless belt 11 is not impeded, and are provided in the state positioned in the vicinity of respective corner portions or in the vicinity of side edge of the plane surface portion 26 as shown in FIG. 8.

Moreover, at the surface side opposite to the base plate 1 of the cover member 25, a boss portion 44 to which a fixing screw 43 for fixing the cover member 25 to the base plate 1 is screw-connected is projected. On the other hand, at the base plate 1 side, a screw insertion hole 51 through which the fixing screw 43 screw-connected to the boss portion 44 is inserted is bored. In the tape cartridge 90 of this embodiment, the boss portion 44 to which the fixing screw 43 is screw-connected is formed as shown in FIG. 8 in the state positioned substantially at the central portion in before and after directions in the vicinity of one side edge close to one side surface wall 27a where the engagement recessed portion 71 provided with the projecting portion 72 is formed.

In a manner as stated above, as the result of the fact that the side where the projecting portion 72 for preventing erroneous insertion with respect to the inadaptable tape drive unit 101 is connected or joined by means of fixing screw 43, even if the tape cartridge is erroneously loaded into the tape drive unit 201 using tape cartridge 101 within which the magnetic tape 110 of width of ¼ inches is accommodated, the supporting member 205 provided at the unit 201 side is forcedly thrust into the engagement recessed portion 71 provided with the projecting portion 72 so that it rides onto the projecting portion 72. Accordingly, if such a force to separate the base plate 1 and the cover member 25 is exerted, it can be prevented that they are easily separated.

As the fixing screw 43 used here, flat countersunk head screw in which the front end surface of the head portion is flat is used. At the peripheral portion of the screw insertion hole 51, a recessed portion into which the head portion of the fixing screw 43 is fitted is formed. By forming the recessed portion at the periphery of the screw insertion hole 51 in this way, the fixing screw 43 can be screw-connected to the cover member 25 without projecting the head portion from the bottom surface of the base plate 1. Thus, the bottom surface of the base plate 1 can be flat surface.

Figure 10:
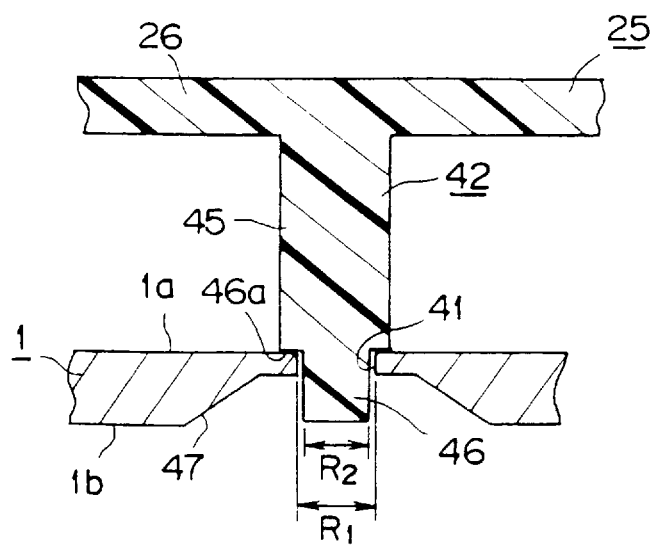
FIG. 10 is a side cross sectional view showing supporting pin provided at cover member and base plate on which the supporting pin is supported.

Further, the supporting pin 42 projected at the cover member 25 is adapted so that, as shown in FIG. 10, at the front end side of a pin body 45, an insertion portion 46 having a diameter smaller than the diameter $R_1$ of the penetration hole 41 bored at the base plate 1 is formed. Namely, at the front end side of the supporting pin 42, the insertion portion 46 having a diameter Rz such that a gap is formed between the insertion portion 46 and the penetration hole 41 is formed is formed.

Moreover, at the circumferential edge of the penetration hole 41 bored at the base plate 1, as shown in FIG. 10, a recess shaped portion 47 such that the thickness gradually becomes great toward the other surface 1b side of the base plate 1 is formed. This recess shaped portion 47 is a portion for receiving a swollen portion 48 constituting slipping off preventing means provided at the front end portion of the supporting pin 42.

Figure 11:
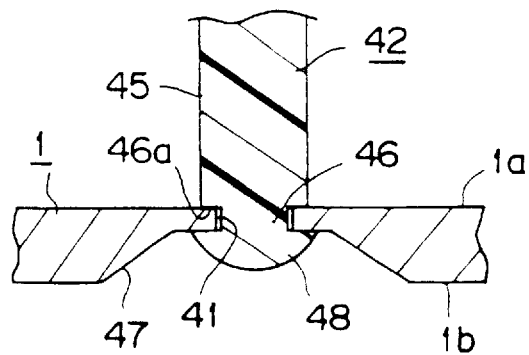
FIG. 11 is a side cross sectional view showing the state where supporting pin provided at cover member is supported on base plate.

Further, the cover member 25 is disposed on one surface 1a of the base plate 1 in the state where the front end surface of the circumferential side wall 27 is butted to one surface 1a of the base plate 1 and insertion portions 46 of the front end side of plural supporting pins 42 are inserted through respective penetration holes 41. The front end portion of the insertion portion 46 inserted through the penetration hole 41 and projected toward the other surface 1b side of the base plate 1 is caused to undergo heating or application of ultrasonic wave so that it is thermally deformed. At the front end portion of the thermally deformed insertion portion 46, the swollen portion 48 having diameter greater than that of at least the penetration hole 41 which takes head portion shape of the screw is formed as shown in FIG. 11. As the result of the fact that the swollen portion 48 is formed at the front end portion of the insertion portion 46, prevention of slipping off from the base plate 1 of the supporting pin 42 is realized.

It is necessary to allow the portion inserted through the penetration hole 41 of the insertion portion 46 not to undergo thermal deformation when the swollen portion 48 is caused to be formed at the insertion portion 46. Namely, it is necessary to prevent that the portion inserted through the penetration hole 41 of the insertion portion 46 is thermally deformed so that the insertion portion 46 is tightly fitted into the penetration hole 41.

It is to be noted that an offset portion 46a formed at the base end portion side of the insertion portion 46 serves as a butting portion with respect to the base plate 1 of the supporting pin 42 to limit quantity of insertion into the penetration hole 41 of the insertion portion 46.

Further, the cover member 25 is supported on the base plate 1 through the supporting pins 42 in the state where prevention of slipping off is realized. Namely, the cover member 25 is placed in the state where it is supported on the base plate 1 with a margin corresponding to gap formed between the insertion portion 46 and the penetration hole 41.

The cover member 25 supported on the base plate 1 through the supporting pins 42 in the state where prevention of slipping off is realized is attached with attachment position with respect to the base plate 1 being fixed as the result of the fact that the fixing screw 43 inserted from the other surface 1b side of the base plate 1 through the screw insertion hole 51 is screw-connected to the boss portion 44 as shown in FIG. 7.

As stated above, as shown in FIGS. 7 and 9, the cover member 25 is adapted so that only one portion of one side surface wall 27a side where the engagement recessed portion 71 provided with the projecting portion 72 is formed is fixed by the fixing screw 43, and the circumferential edge portion thereof is supported by the supporting pins 42 for supporting the cover member 25 in such a manner to have a gap between the supporting pin 42 (the insertion portion 46) and the penetration hole 41. Accordingly, even in the case where the tape cartridge 90 is caused to undergo thermal deformation, difference of thermal expansion or thermal contraction in the plane surface direction resulting from difference between coefficient of thermal expansion of the base plate 1 of metal and that of the cover member 25 of synthetic resin can be absorbed by the gap between the penetration hole 41 and the insertion portion 46 of the supporting pin 42 inserted through the penetration hole 41. Accordingly, deformation of the base plate 1 and the cover member 25 can be prevented.

Namely, in the case where the tape cartridge 90 is caused to undergo thermal deformation, the base plate 1 and the cover member 25 are thermally expanded or thermally contracted with the point fixed by the fixing screw 43 being as center. However, difference of thermal expansion or thermal contraction in the plane surface direction resulting from difference of coefficient of thermal expansion produced in this instance is absorbed by the gap between the penetration hole 41 and the insertion portion 46 of the supporting pin 42.

Figure 12:
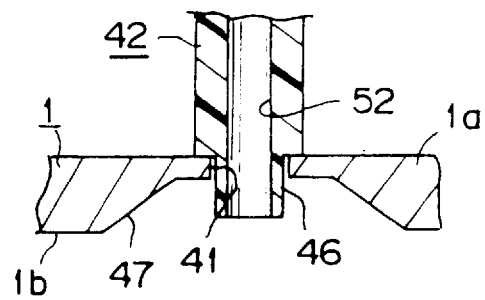
FIG. 12 is a side cross sectional view showing another embodiment of the supporting pin provided at the cover member.
Figure 13:
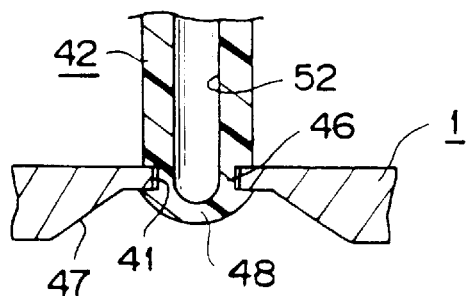
FIG. 13 is a side cross sectional view showing the state where supporting pin shown in FIG. 5 provided at the cover member is supported on base plate.
Figure 14:
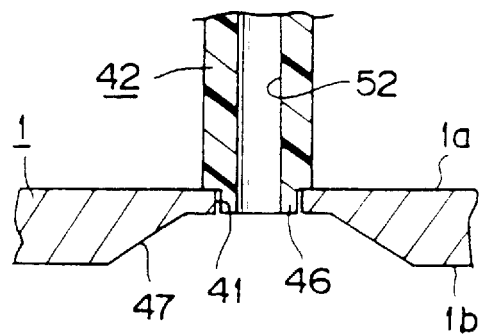
FIG. 14 is a side cross sectional view showing a further embodiment of the supporting pin provided at the cover member.

While the supporting pin 42 is formed shaft-shaped in the above-described embodiment, a hollow portion 52 for screw connection such as tapping screw, etc. may be formed from the front end side at the central portion as shown in FIG. 12. Also with respect to the supporting pin 42, at the front end portion of the insertion portion 46 projected toward the other surface 1b side of the base plate 1, there is formed swollen portion 48 having a slipping off preventing function, which has diameter greater than that of the penetration hole 41 as shown in FIG. 13 after undergone heating or application of ultrasonic wave. When the swollen portion 48 is formed at the front end portion of the insertion portion 46, the hollow portion 52 is closed as shown in FIG. 13. However, by cutting the swollen portion 48 as occasion demands as shown in FIG. 14, the hollow portion 52 is permitted to be faced toward the outside.

Figure 15:
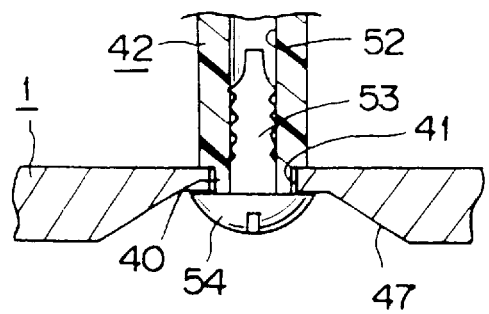
FIG. 15 is a side cross sectional view showing the state where the supporting pin shown in FIG. 8 provided at the cover member is supported on the base plate.

In view of the above, an approach is employed to cut the swollen portion 48 to allow the hollow portion 52 to be faced toward the outside to thereby once detach the cover member 25 from the base plate 1 thereafter to screw-connect a set screw 53 such as tapping screw, etc. to the hollow portion 52 as shown in FIG. 15, thereby making it possible to attach the cover member 25 onto the base plate 1 for a second time. For this reason, it becomes possible to carry out exchange of the magnetic tape 4 covered by the cover member or repair of the tape drive mechanism similarly covered by the cover member 25, etc. In the case where such set screw 53 is used, head portion 54 of the set screw 53 is caused to serve as slipping-off prevention means from the base plate 1 of the supporting pin 42.

While swollen portion 48 for prevention of slipping off is integrally formed by thermally deforming the front end side of the supporting pin 42 in the above-described respective embodiments, a member separate from the supporting pin 42 may be used to constitute slipping off prevention means.

Figure 16:
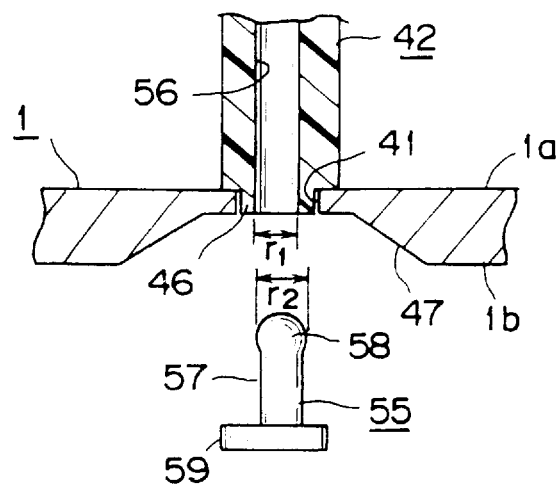
FIG. 16 is a side cross sectional view showing an example where supporting pin provided at cover member is supported on base plate by using engagement pin.
Figure 17:
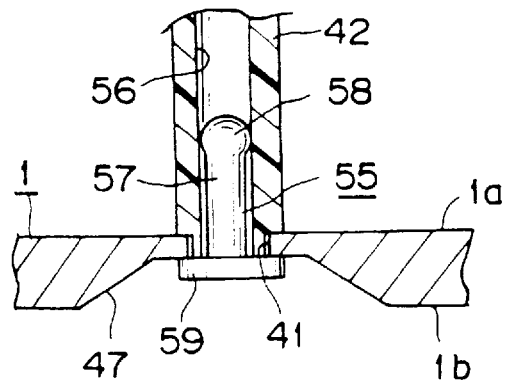
FIG. 17 is a side cross sectional view showing the state where the supporting pin shown in FIG. 16 is supported on the base plate.

This supporting pin 42 is adapted as shown in FIG. 16 so that insertion portion 46 inserted through penetration hole 41 is caused to have length such that it is not projected from the penetration hole 41, and an engagement hole 56 for engaging an engagement pin 55 from the front end side is bored at the central portion. When the engagement pin 55 is engaged with the engagement hole 56 from the front end side of the supporting pin 42 as shown in FIG. 17 in the state where the insertion portion 46 is inserted through the penetration hole 41, this supporting pin 42 is supported on the base plate 1.

The engagement pin 55 used here is as shown in FIG. 16 such that a projection 58 having outside diameter $r_2$ slightly greater than inside diameter $r_1$ of the engagement hole 56 is formed at the front end of a shaft portion 57, and a flange portion 59 having diameter greater than diameter $R_1$ of the penetration hole 41 is formed at the base end side of the shaft portion 57. This engagement pin 55 is adapted so that when the projection 58 of the shaft portion 57 front end is engaged with the engagement hole 56 so that it is attached by the supporting pin 42, whereby the flange portion 59 functions as a slipping-off prevention member from the base plate 1 of the supporting pin 42. At this time, the shaft portion 57 is adapted so that when the projection 58 is engaged with the engagement hole 56, it is formed so as to have length sufficient to be engaged with the engagement hole 56 at the position where the projection 58 is sufficiently spaced from the insertion portion 46 in order that the diameter of the insertion portion 46 is not caused to be large by the projection 58.

Since the necessity of thermally deforming the supporting pin 42 is eliminated by using the engagement pin 55 in this way, the necessity of using heating unit or ultrasonic wave unit for manufacturing the tape cartridge 90 is eliminated.

Figure 18:
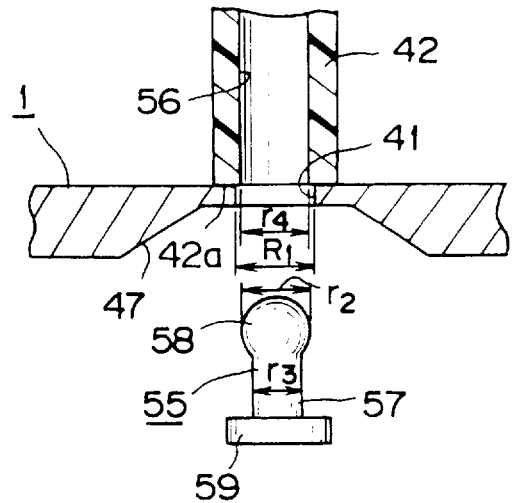
FIG. 18 is a side cross sectional view showing another example where supporting pin provided at the cover member is supported on base plate by using engagement pin.
Figure 19:
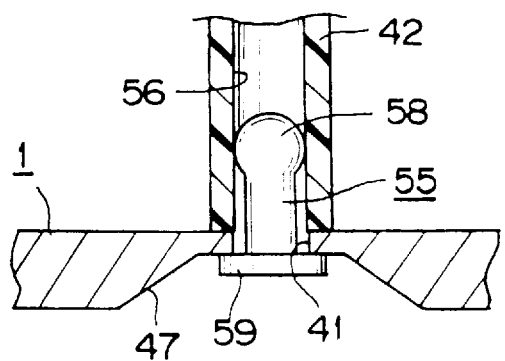
FIG. 19 is a side cross sectional view showing the state where the supporting pin shown in FIG. 18 is supported on base plate.

Further, while insertion portion 46 having diameter smaller than the diameter $R_1$ of the penetration hole 41 is integrally formed at the supporting pin 42 in the above-described embodiment, shaft portion 57 of engagement pin 55 engaged with engagement hole 56 from the front end side of the supporting pin 42 may be caused to be the insertion portion having small diameter inserted through the penetration hole 41 as shown in FIGS. 18 and 19.

In this case, the diameter $r_3$ of the shaft portion 57 of the engagement pin 55 is caused to be diameter smaller than the diameter $R_1$ of the penetration hole 41 as shown in FIG. 18. Further, the outside diameter $r_2$ of projection 58 formed at the front end of the shaft portion 57 is caused to be smaller than the diameter $R_1$ of the penetration hole 41 in order to allow it to be inserted through the penetration hole 41. In addition, the inside diameter $r_4$ of the engagement hole 56 formed at the supporting pin 42 is caused to be smaller than the outside diameter $r_2$ of the projection 58.

In the case of this example, the cover member 25 is disposed on the base plate 1 in the state where the front end surface 42a of the supporting pin 42 is caused to butted to or collide with one surface 1a of the base plate 1. In addition, the cover member 25 is supported on the base plate 1 by the engagement pin 55 engaged with the engagement hole 56 from the front end side of the supporting pin 42.

In the case where the supporting pin and the engagement pin are constituted as shown in FIGS. 18 and 19, the shaft portion 57 of the engagement pin 55 can have a sufficiently small diameter as compared to the penetration hole 41. Accordingly, it is possible to form a large gap between the shaft portion 57 and the penetration hole 41. Thus, a larger difference of thermal expansion or thermal contraction resulting from difference between coefficient of thermal expansion of the base plate 1 of metal and that of the cover member 25 of synthetic resin.

Meanwhile, in the tape cartridge 90 adapted for attaching the cover member 25 on the base plate 1 by engaging the engagement pin 55 into the engagement hole 56 of the supporting pin 42, it is possible to easily detach the cover member 25 from the base plate 1 by detaching the engagement pin 55 from the supporting pin 42. Further, by detaching the cover member 25, it becomes possible to easily carry out exchange of magnetic tape 4 wound between the reel support shafts disposed on the base plate 1 and/or repair of tape drive mechanism, etc. similarly disposed on the base plate 1.

It is to be noted that the fixing screw 43 for fixing the cover member 25 on the base plate 1 can be easily detached by using tool such as screwdriver, etc.

Figure 20:
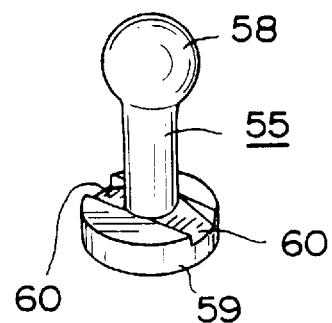
FIG. 20 is a perspective view showing engagement pin engaged with supporting pin.

In order to more easily carry out detachment from the base plate 1 of the cover member 25, as shown in FIG. 20, at least one groove portion, desirably two or three groove portions 60 for inserting tool for detachment such as screwdrivers, etc. are provided at the surface of the shaft portion 57 side of the flange portion 59 of the engagement pin 55 as shown in FIG. 20. Thus, by inserting tool for detachment into the groove portion 60, it becomes possible to easily detach the engagement pin 55 from the supporting pin 42.

Furthermore, since the supporting pin 42 is simply supported at the penetration hole 41 of the base plate 1 so that it is only supported on the base plate 1 in the above-described respective embodiments, the cover member 25 disposed on the base plate 1 would be easily detached from the base plate 1 for a time period until complete attachment is completed.

Figure 21:
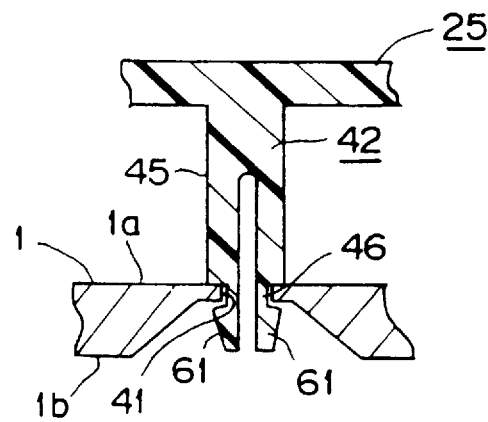
FIG. 21 is a side cross sectional view showing a further embodiment of the supporting pin provided at cover member.

In view of the above, a pair of holding pawls 61, 61 for provisional fixing having a diameter greater than that of the penetration hole 41 are provided at the front end portions of the supporting pin 42 as shown in FIG. 21. These holding pawls 61, 61 are provided at the front end side of the insertion portion 46 inserted into the penetration hole 41. Moreover, a slotted groove 62 is bored extending over the axial direction at the pin body 45 of the supporting pin 42. This slotted groove 62 is adapted so that when the holding pawls 61, 61 are inserted through the penetration hole 41, it allows these holding pawls 61, 61 to undergo elastic deformation to thereby reduce the outer circumferential diameter so that insertion into the insertion hole 41 can be made.

Further, the supporting pin 42 is adapted so that when the insertion portion 46 is inserted through the penetration hole 41 so that the supporting pin 42 is supported on the base plate 1, a pair of holding pawls 61, 61 are projected toward the other surface 1b side of the base plate 1, whereby prevention of slipping off from the base plate 1 is realized. Accordingly, the cover member 25 is prevented from slipping off and is thus supported on the base plate 1.

Figure 22:
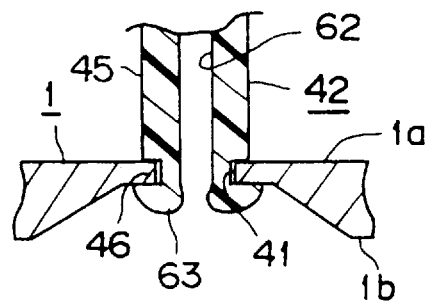
FIG. 22 is a side cross sectional view showing the state where the supporting pin shown in FIG. 21 provided at the cover member is supported on base plate.

Moreover, a pair of holding pawls 61, 61 are thermally deformed as shown in FIG. 22 so that they are caused to be a swollen portion 63 for carrying out reliable prevention of slipping off from the penetration hole 41 of the supporting pin 42.

It is to be noted that with respect to the supporting pin 42 for supporting the cover member 25 on the base plate 1, in one tape cartridge 90, several ones of the various kinds of supporting pins 42 as described above may be used in combination without using common supporting pins for all of supporting pins.

Figure 23:
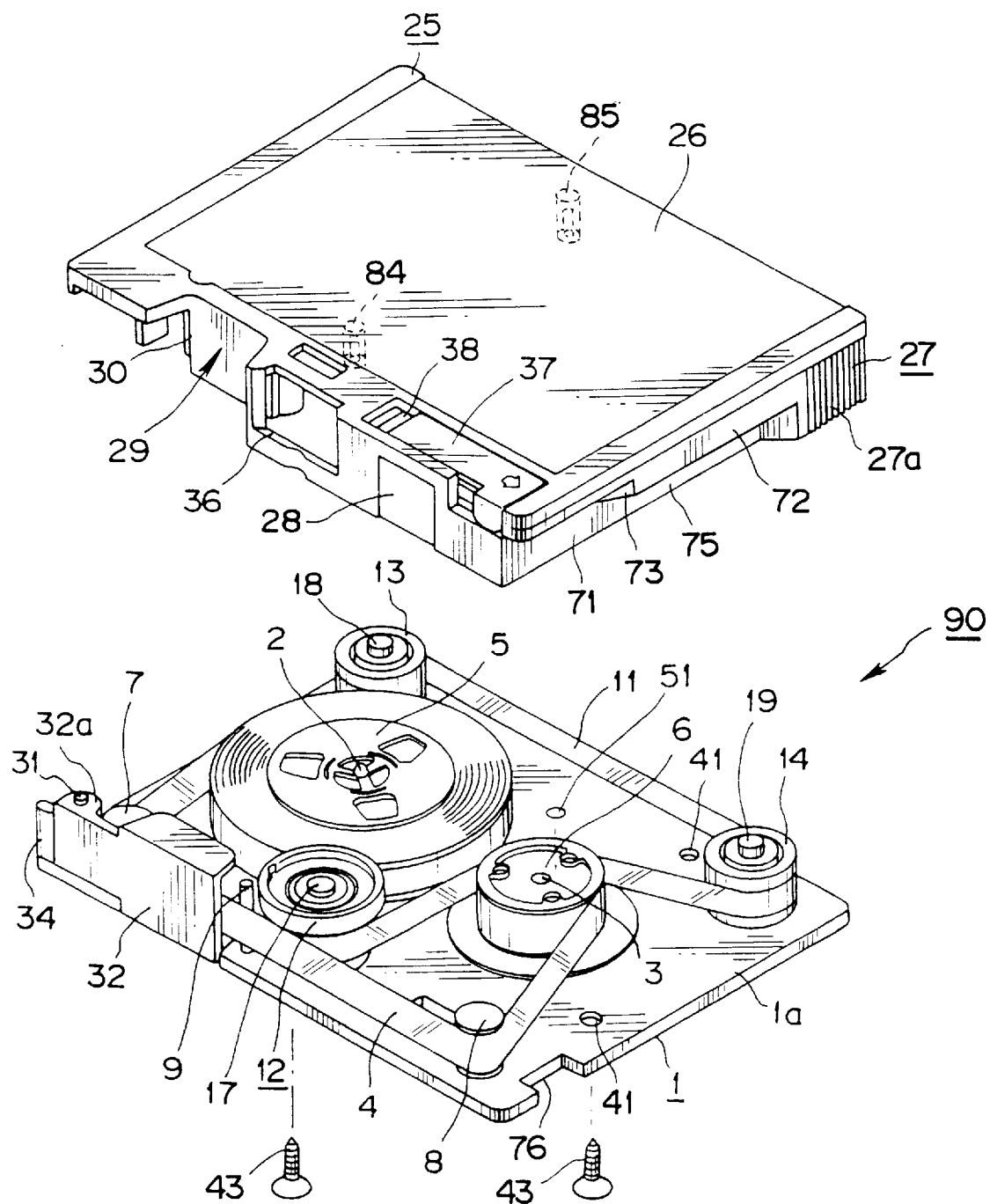
FIG. 23 is an exploded perspective view showing another embodiment of the tape cartridge according to this invention in the state where the cover member is detached therefrom.
Figure 24:
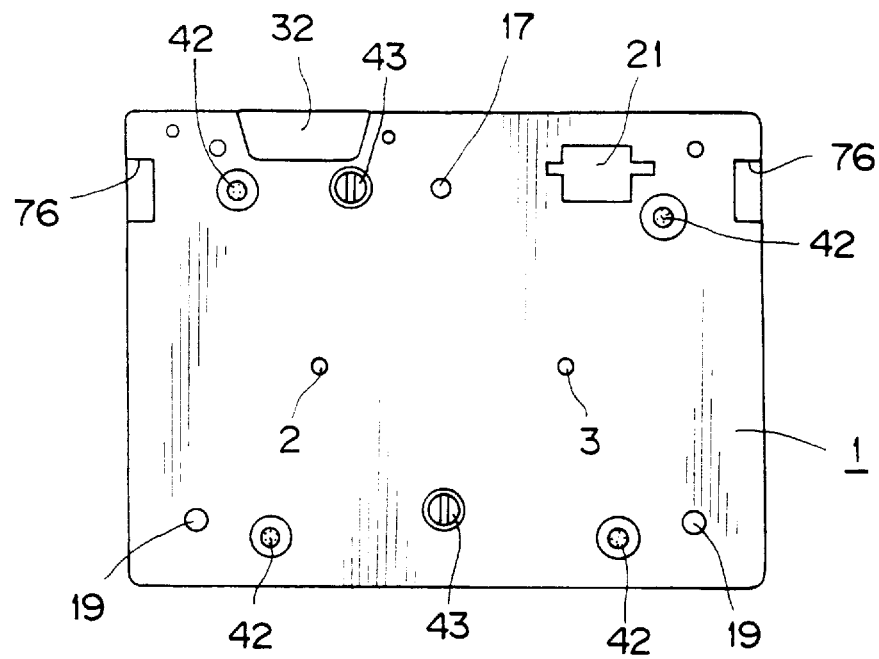
FIG. 24 is a bottom view of the tape cartridge shown in FIG. 23.

While one portion of one side surface wall 27a side portion of the cover member 25 is fixed by means of fixing screw 43 in the above-described embodiment, there may be employed a configuration as shown in FIGS. 23 and 24 such that two portions in the vicinity of the central portion in left and right directions extending over the arrangement direction of a pair of tape reels 5, 6 disposed on the base plate 1 are fixed. In this case, as shown in FIG. 23, at the surface side opposite to the base plate 1 of the cover member 25, there are projected a pair of boss portions 84, 85 to which the fixing screws 43 are screw-connected in the state positioned in the vicinity of the central portion in the left and right directions extending over the arrangement direction of a pair of tape reels 5, 6 disposed on the base plate 1 when the cover member 25 is attached on the base plate 1. Namely, one boss portion 84 is projected so that it is positioned in the vicinity of the drive roller 12 attached substantially at the central portion of the front edge side of the base plate 1 when the cover member 25 is attached on the base plate 1, and the other boss portion 85 is projected so that it is positioned substantially at the central portion of the backward edge side of the base plate 1 when the cover member 25 is attached on the base plate 1.

Further, the fixing screws 43 are inserted through screw insertion holes 51 bored at the base plate 1 so that they are screw-connected to respective boss portions 84, 85. Thus, the cover member 25 is fixed on the base plate 1.

As stated above, the cover member 25 is adapted so that only two portions in the vicinity of the central portion in left and right directions extending over the arrangement direction of a pair of tape reels 5, 6 are fixed by fixing screws 43, and the circumferential edge portion thereof is supported by the supporting pins 42 for supporting it in a manner to have a gap between the supporting pin 42 and the penetration hole 41. Accordingly, even in the case where this tape cartridge 90 is caused to undergo thermal deformation, difference of thermal expansion or thermal contraction in the plan surface direction resulting from difference between coefficient of thermal expansion of the base plate 1 of metal and that of the cover member 25 of synthetic resin can be absorbed by gap between the penetration hole 41 and the penetration portion 46 of the supporting pin 42 inserted through the penetration hole 41. Thus, deformation of the base plate 1 and the cover member 25 can be prevented. Moreover, since the tape cartridge 90 is such that the portion in the vicinity of the central portion where the drive roller 12 is disposed is fixed by the fixing screw 43, even if a force in a direction to separate the base plate 1 and the cover member 25 is applied, it is suppressed that deformation takes place in the vicinity of the central portion of the base plate 1 on which the drive roller support shaft 17 is vertically provided. Accordingly, the degree of perpendicularity of the drive roller supporting shaft 17 is maintained. As a result, stable precise rotation of the drive roller 12 is ensured. Thus, it is prevented that bad influence is exerted on traveling of the magnetic tape 4.

While the cover member 25 is adapted in this embodiment so that two portions in the vicinity of the central portion in left and right directions extending over the arrangement direction of a pair of tape reels 5, 6 are fixed on the base plate 1 by using two fixing screws 43, 43, if the cover member can be fixed on the base plate 1 after undergone positioning with respect thereto, there may be employed a cover member adapted to be fixed by only one fixing screw 43. In this case, the cover member 25 is fixed by fixing screw 43 at the position in the vicinity of the drive roller 12. The reason thereof is as follows. Namely, even if any deformation takes place at the base plate 1, an approach is carried out such that deformation is caused to be produced with the position in the vicinity of the drive roller 12 being as reference fixed point, whereby deformation in the vicinity of the drive roller support shaft 17 on which the drive roller 12 is supported which exerts influence on traveling characteristic of the magnetic tape 4 is supported can be suppressed.

Figure 25:
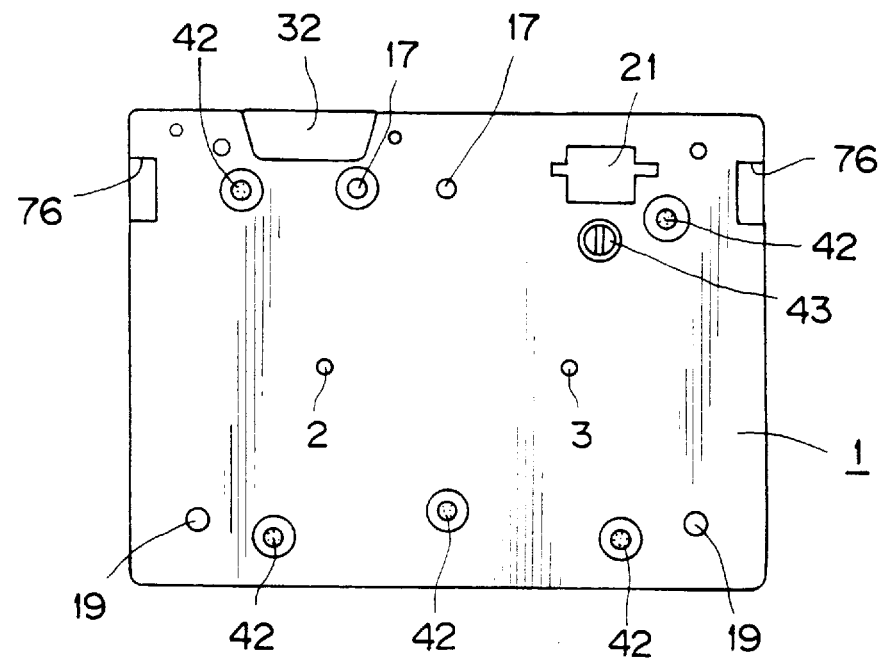
FIG. 25 is a bottom view of a further embodiment of the tape cartridge according to this invention.

Moreover, in the case where the cover member 25 is fixed by only one fixing screw 43 with respect to the base plate 1, the portion positioned at the back side of the reflection mirror 21 may be fixed by means of fixing screw 43 as shown in FIG. 25. Since the back side of the reflection mirror 21 is located at the position close to one side surface wall 27a where engagement recessed portion 71 provided with projecting portion 72 is formed, even if such a force to separate the base plate 1 and the cover member 25 is exerted on the portion therebetween, it can be prevented that they are easily separated.

Furthermore, the cover member 25 may be with respect to the base plate 1 such that one or two supporting pins 42 provided in the vicinity of one side surface wall 27a where engagement recessed portion 71 provided with projecting portion 72 is formed, or supporting pins 42 engaged with two portions in the vicinity of the central portion in left and right directions extending over the arrangement direction of a pair of tape reels 5, 6 are force-inserted into the penetration holes 41 of the base plate 1 to fix it so that it does not move in the horizontal direction of the base plate 1. Namely, if the cover member 25 can be fixed so as have reference fixed point with respect to the base plate 1, it is not necessarily required to employ a fixing method using fixing screw.

Industrial Applicability

In accordance with the tape cartridge according to this invention, the base plate of metal on which tape reels on which the magnetic tape is wound and the drive roller are disposed, and the cover member for covering the base plate are adapted so that when such a force to separate the base plate and the cover member is applied, the position for limiting such a separation to exert influence on rotation of the tape reels and the drive roller is firmly fixed by fixing means such as fixing screw, etc., and the other supporting portion is supported by the supporting pin having the insertion portion of diameter smaller than that of penetration hole provided at the base plate so that they are joined or connected in such a manner that a gap is formed between the supporting pin and the penetration hole. Accordingly, even if this tape cartridge is erroneously loaded into the tape drive unit, etc. so that such a force to separate the base plate and the cover member is applied, such a separation to exert influence on rotation of the tape reels and the drive roller is limited, thus making it possible to securely maintain joining or connecting state between the base plate and the cover member. Further, also in the case where the tape cartridge is caused to undergo heating (increase in temperature) or cooling so that it is thermally expanded or thermally contracted, the base plate and the cover member are such that difference of thermal expansion or thermal contraction resulting from difference between coefficients of thermal expansion of the base plate and the cover member which consist of materials different from each other is absorbed by gap between the supporting pin for supporting the portion except for the fixing portion of the cover member and the penetration hole, thus making it possible to prevent distortion or deformation of the base plate and the cover member, particularly the base plate.

Since distortion or deformation of the base plate can be prevented, it is possible to vertically provide, with high accuracy, the support shafts on which the tape reels and the drive roller are vertically supported on the base plate. Accordingly, it is possible to realize stable traveling of the magnetic tape at all times.

In addition, since the cover member is attached on the base plate by means of fixing screws and plural supporting pins to which prevention of slipping-off from the base plate is implemented, it is possible to securely integrally attach the cover member on the base plate. Accordingly, even in the case where the tape cartridge is caused to undergo impact such as falling, etc., it is possible to securely prevent bending or deformation of the base plate.

We claim:

1. A tape cartridge for insertion into a tape drive unit comprising:

a base plate of metal having a top surface side on which are vertically provided a pair of reel support shafts on which a pair of tape reels across which a tape body is laid are rotatably supported in parallel, and a drive roller support shaft on which a drive roller for allowing the tape body laid across the tape reels to undergo traveling operation from one tape reel toward the other tape reel is rotatably pivotally supported;

a cover member of synthetic resin attached to said base plate in a manner to cover said top surface side of the base plate on which the pair of tape reels and the drive roller are disposed, said cover member having a front surface side;

a pair of first and second groove portions respectively provided at side of the cover member, and positioned so that, at the time of loading into a tape drive unit, supporting members provided on the tape drive unit side are inserted thereinto;

a projecting portion provided within the first groove portion so as to allow admission of a supporting member of the tape drive unit to be smaller with respect to the second groove portion, said projecting portion projecting downwardly from an upper end of said first groove portion at a first end surface portion thereof and having an inclined surface portion at a front end surface position thereof to reduce the impact force when said supporting member contacts said projecting portion;

fixing connection means for joining the cover member to the base plate and located at least at one joining location provided near a central portion of the base plate; and withdrawal preventing means for preventing withdrawal of the cover member with respect to the base plate provided in the vicinity of the first groove portion, said withdrawal preventing means comprising a plurality of supporting pins projecting from a bottom surface of the cover member opposite to said base plate and each supporting pin being provided with an insertion portion having a diameter smaller than that of a penetration hole of the base plate, and slipping-off preventing means provided at a front end side of the supporting pin of the insertion portion when the insertion portion is inserted into the penetration hole, wherein the withdrawal preventing means is a swollen portion of an engagement member attached at a front end of the supporting pin inserted through the penetration hole.

2. A tape cartridge as set forth in claim 1, wherein said fixing connection means includes a plurality of fixing screws and wherein the cover member is joined to said base plate so that at least two fixing screws are located in the vicinity of the central portion of the base plate.

3. A tape cartridge as set forth in claim 1, wherein said fixing connection means is a slotted screw which is screw-connected to a boss portion projecting from a bottom surface side of the cover member which is opposed to the said base plate.

4. A tape cartridge as set forth in claim 1, wherein a third groove portion narrower in width than the first groove portion is provided between the projecting portion provided within the first groove portion and the base plate.

5. A tape cartridge as set forth in claim 1, wherein said withdrawal preventing means is positioned rearwardly of a reflection mirror disposed adjacent to said front surface side when the cover member is joined to the base plate.

6. A tape cartridge for insertion into a tape drive unit comprising:

a base plate of metal having a top surface side on which are vertically provided a pair of reel support shafts on which a pair of tape reels across which a tape body is laid are rotatably supported in parallel, and a drive roller support shaft on which a drive roller for allowing the tape body laid across the tape reels to undergo traveling operation from one tape reel toward the other tape reel is rotatably pivotally supported;

a cover member of synthetic resin attached to said base plate in a manner to cover said top surface side of the base plate on which the pair of tape reels and the drive roller are disposed, said cover member having a front surface side;

a pair of first and second groove portions respectively provided at side of the cover member, and positioned so that, at the time of loading into a tape drive unit, supporting members provided on the tape drive unit side are inserted thereinto;

a projecting portion within the first groove portion so as to allow admission of a supporting member of the tape drive unit to be smaller with respect to the second groove portion, said projecting portion projecting downwardly from an upper end of said first groove portion at a first end surface portion thereof and having an inclined surface portion at a front end surface position thereof to reduce the impact force when said supporting member contacts said projecting portion;

fixing connection means for joining the cover member to the base plate and located at least at one joining location provided near a central portion of the base plate; and withdrawal preventing means for preventing withdrawal of the cover member with respect to the base plate provided in the vicinity of the first groove portion, said withdrawal preventing means comprising a plurality of supporting pins projecting from a bottom surface of the cover member opposite to said base plate and each supporting pin being provided with an insertion portion having a diameter smaller than that of a penetration hole of the base plate and slipping-off preventing means provided at a first end side of the supporting pin of the insertion portion when the insertion portion is inserted into the penetration hole, wherein the withdrawal preventing means is a head portion of an engagement member attached at a front end portion of the supporting pin inserted through the penetration hole.

7. A tape cartridge for inserting into a tape drive unit comprising:

a base plate of metal having a top surface side on which are vertically provided a pair of reel support shafts on which a pair of tape reels across which a tape body is laid are rotatably supported in parallel, and a drive roller support shaft on which a drive roller for allowing the tape body laid across the tape reels to undergo traveling operation from one tape reel toward the other tape reel is rotatably pivotally supported;

a cover member of synthetic resin attached to said base plate in a manner to cover said top surface side of the base plate on which the pair of tape reels and the drive roller are disposed, said cover member having a front surface side;

a pair of first and second groove portions respectively provided at side surfaces of the cover member, and positioned so that, at the time of loading into a tape drive unit, supporting members provided on the tape drive unit side are inserted thereinto;

a projecting portion provided within the first groove portion so as to allow admission of a supporting member of the tape drive unit to be smaller with respect to the second groove portion, said projecting portion projecting downwardly from an upper end of said first groove portion at a first end surface portion thereof and having an inclined surface portion at a front end surface position thereof to reduce the impact force when said supporting member contacts said projecting portion;

fixing connection means for joining the cover member to the base plate and located at least at one joining location provided near a central portion of the base plate; and withdrawal preventing means for preventing withdrawal of the cover member with respect to the base plate provided in the vicinity of the first groove portion, said withdrawal preventing means comprising a plurality of supporting pins projecting from a bottom surface of the cover member opposite to said base plate and each supporting pin being provided with an insertion portion having a diameter smaller that that of a penetration hole of the base plate and slipping-off preventing means provided at a first end side of the supporting pin of the insertion portion when the insertion portion is inserted into the penetration hole, wherein the withdrawal preventing means is adapted so that a hollow portion for attachment of an engagement member is formed at a central portion of the front end side of the supporting pin.

\* \* \* \* \*